(No Model.)
F. W. OESTERMEYER.
Barrel Roller.
No. 242,967.        Patented June 14, 1881.
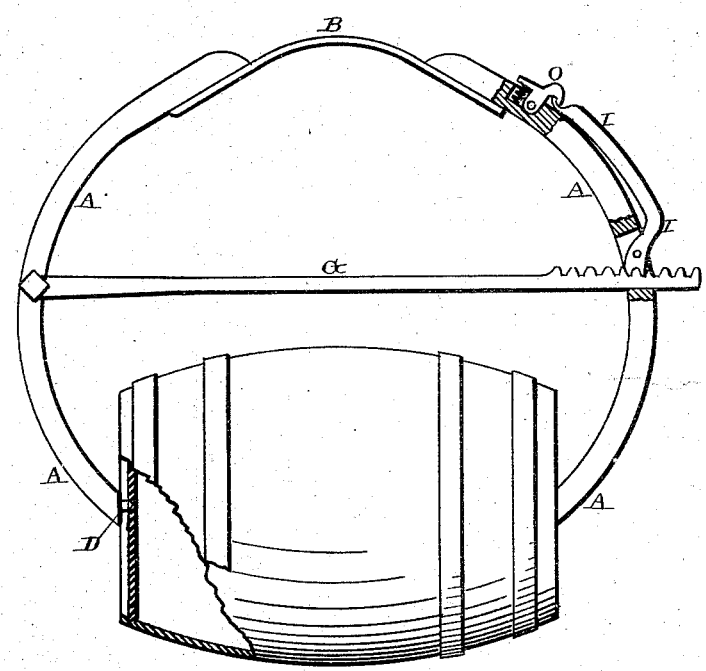
Witnesses.
Wm W. Mortimer
W. H. Kern
Inventor
F. W. Oestermeyer,
per
F. A. Lehmann,
Att'y

UNITED STATES PATENT OFFICE.

FREDERICK W. OESTERMEYER, OF ZANESVILLE, OHIO.

BARREL-ROLLER.

SPECIFICATION forming part of Letters Patent No. 242,967, dated June 14, 1881.

Application filed April 9, 1881. (No model.)

*To all whom it may concern:*

Be it known that I, FRED. W. OESTERMEYER, of Zanesville, in the county of Muskingum and State of Ohio, have invented certain new and useful Improvements in Barrel-Rollers; and I do hereby declare the following to be a full, clear, and exact description of the invention, such as will enable others skilled in the art to which it pertains to make and use it, reference being had to the accompanying drawing, which forms part of this specification.

My invention relates to an improvement in barrel-rollers; and it consists in the combination of two levers which are connected together at their outer ends by a suitable spring, and which are provided at their inner ends with pivots to catch in the head of the barrel, and which levers are connected together near their centers by means of a rack-bar and toothed lever, whereby in locking the lever in place the two arms are tightened upon the end of the barrel, as will be more fully described hereinafter.

The object of my invention is to provide a cheap, simple device, whereby barrels, kegs, and casks can be rolled easily and rapidly about, and which is made adjustable, so as to be used upon barrels of all kinds with equal facility.

The accompanying drawing represents a plan view of my invention, partly in section.

A represents two curved arms or levers, which are connected together at their outer ends by means of a strong flat spring, B. The inner ends of these two arms are provided with suitable sharp points or pivots D, which are pressed against or into the heads of the barrel, and which serve as the pivots upon which the barrel turns. These two levers are connected together at their outer ends by means of a spring, so that whenever the levers are left free it will cause the free ends of the levers to spring slightly apart, but not far enough to release the barrel from the pivots, and at the same time the spring allows the levers to be adjusted freely to barrels of different lengths.

Pivoted to one of the arms, near its center, and extending through the horizontal slot made in the opposite lever, is the rack-bar G, and pivoted in the same slot through which the rack-bar passes is the toothed lever I. This lever is so pivoted and arranged in relation to the rack-bar that whenever the lever is pressed back against the edge of the lever to which it is pivoted its end catches in the spring-catch O, and the lever is thus held securely in position.

In order to move the two levers freely back and forth without any interference on the part of the toothed lever, it is necessary to turn the toothed lever so that its teeth will not mesh with the teeth of the rack-bar, and then the two levers can be freely opened and closed at will. When, however, it is attempted to close the toothed lever inward its teeth catch in the teeth of the rack, and the two levers A will be forced inward toward each other with sufficient power to cause the pivots to sink into the heads of the barrel. Whenever the outer end of the toothed lever is released from the spring-catch which holds it in position the elastic force of the spring B instantly moves the ends of the two levers slightly apart, so as to nearly withdraw the pivots from contact with the head of the barrel. To entirely free the barrel the levers must be forced apart so that the pivots will pass over the flange around the heads of the barrel. After the levers have thus been applied to the barrel, the barrel can be rolled freely around.

This device is also equally well adapted for rolling kegs and casks.

Having thus described my invention, I claim—

In a barrel-roller, the combination of the two levers A, connected together at their outer ends by means of a spring, B, a rod for drawing the two levers more closely together, an operating-lever, and a catch, substantially as shown and described.

In testimony whereof I affix my signature in presence of two witnesses.

FREDERICK W. OESTERMEYER.

Witnesses:
WM. H. CUNNINGHAM, Jr.,
FRANK M. FORD.